United States Patent [19]

Layne et al.

[11] Patent Number: 6,000,529

[45] Date of Patent: Dec. 14, 1999

[54] UNDERGUARD ASSEMBLY FOR MODULAR CONVEYORS

[75] Inventors: James L. Layne, Bowling Green; Melissa L. Craft, Glasgow, both of Ky.

[73] Assignee: Span Tech LLC, Glasgow, Ky.

[21] Appl. No.: 08/982,557

[22] Filed: Dec. 2, 1997

[51] Int. Cl.[6] .................................................. B65G 45/00
[52] U.S. Cl. ............................................................ 198/494
[58] Field of Search .................................. 198/494, 580, 198/861.1, 860.3

[56] References Cited

U.S. PATENT DOCUMENTS

| | | |
|---|---|---|
| 4,953,693 | 9/1990 | Draebel . |
| 5,031,757 | 7/1991 | Draebel et al. . |
| 5,070,999 | 12/1991 | Layne et al. . |
| 5,078,250 | 1/1992 | Cole ..................................... 198/861.1 |
| 5,119,926 | 6/1992 | Draebel et al. . |
| 5,255,609 | 10/1993 | Miyagawa et al. ................... 198/861.1 |

*Primary Examiner*—Joseph E. Valenza
*Assistant Examiner*—Mark Deuble
*Attorney, Agent, or Firm*—King and Schickli

[57] ABSTRACT

An underguard assembly is provided for use with a modular conveyor of a conveyor system. The underguard is formed of a flexible web that hangs beneath the conveyor to catch debris falling from the sides of or through the conveying surface. To support the web, a stiffener rod is placed in an elongate pocket formed along each longitudinal edge. Opposed support assemblies spaced along the sides of the conveyor frame hold the enlarged pocket formed by the stiffener rod. An adjustment means is provided on each support assembly that allows the web to be easily attached and detached from the conveyor frame. Further, the support assemblies adjacent the end of the conveyor are modified to support the web beyond the end of the conveyor. This allows the web of a first modular conveyor to overlap with the web at the start of an adjacent modular conveyor, thereby providing a substantially seamless underguard function for a conveyor system.

23 Claims, 5 Drawing Sheets

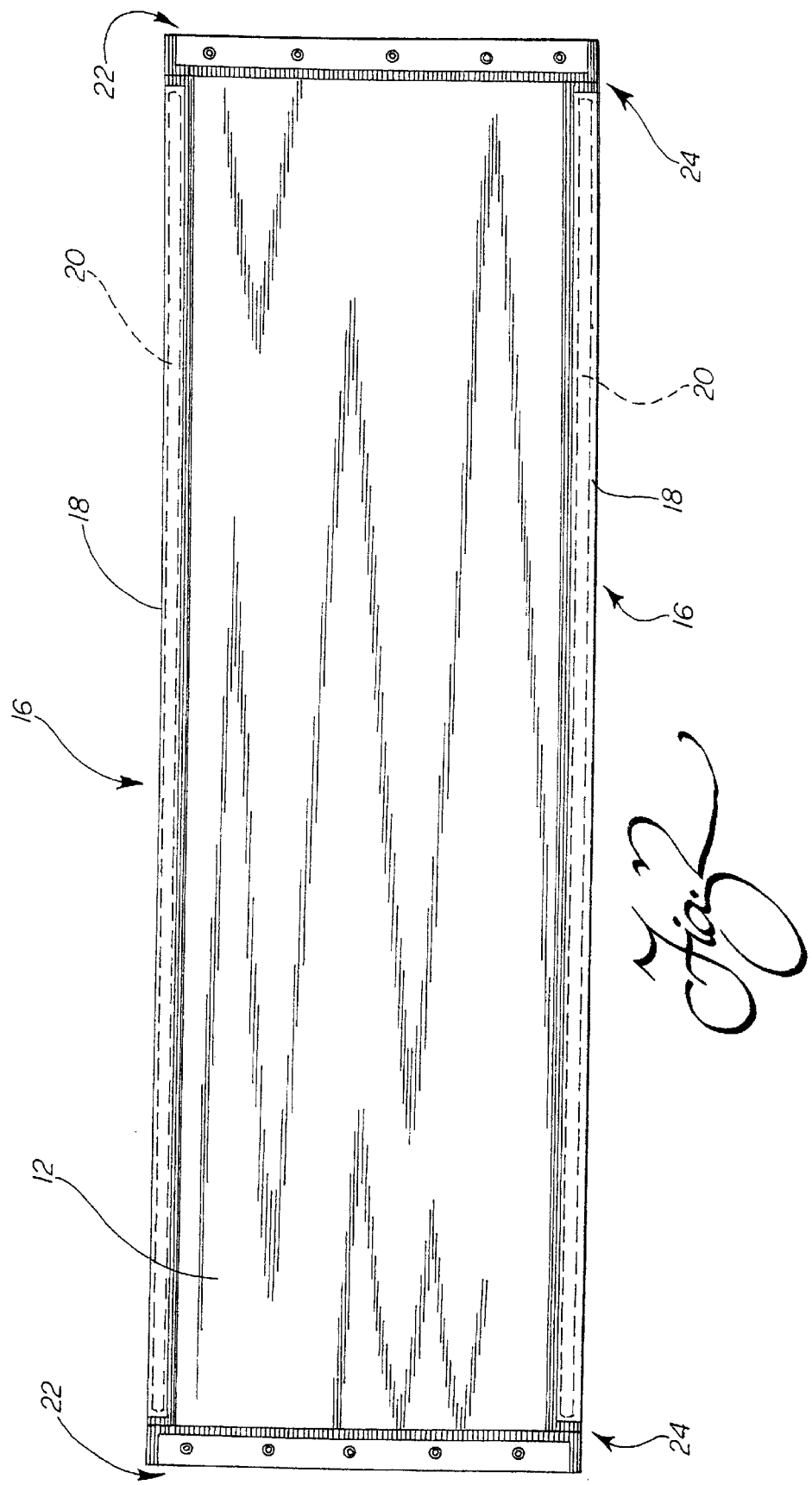

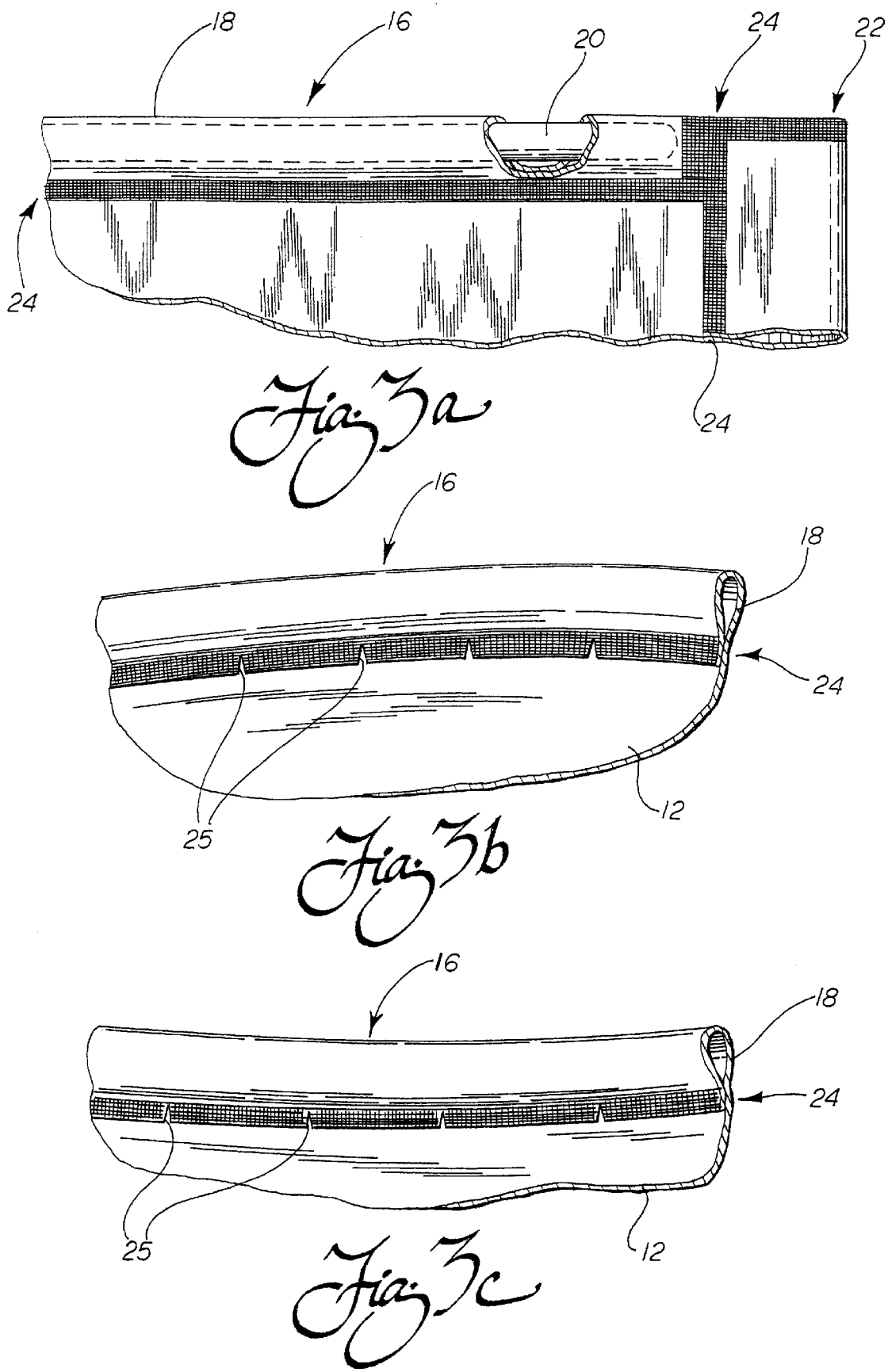

UNDERGUARD ASSEMBLY FOR MODULAR CONVEYORS

TECHNICAL FIELD

The present invention relates generally to conveyors and, more particularly, to conveyor systems including an underguard assembly that hangs beneath the conveyor to catch debris or the like.

BACKGROUND OF THE INVENTION

In food processing, manufacturing and similar systems, it is common to have conveyors, such as side flexing, modular link conveyors, positioned in an end-to-end relationship so as to move articles along a feed path. Such systems are especially beneficial in the fast food processing and small article manufacturing industries, where it is often necessary to provide various lengths of conveyors and different conveyor geometries that connect to move the product from one station to another to allow the desired functions to be performed.

The conveying surface of modular link conveyors have an open design to facilitate the removal of debris and product residue. An example of such an open design is taught in Applicant's issued U.S. Pat. Nos. 4,953,693 and 5,031,757, which disclose side flexing, continuous conveying surfaces comprised of the modular links connected by cross rods and guided by side links engaging guide strips on the support frame.

To collect the debris that falls between the links, it is common to provide an underguard that hangs beneath the conveyor, thereby collecting the debris and keeping it off of the floor. One form of the known underguards comprises a web of material that is supported from opposite sides of the conveyor frame by hooks. Specifically, a series of hooks are suspended from the frame of the conveyor, and the free end of the hooks are inserted through corresponding apertures formed in the edges of the web. Although such an arrangement prevents debris from directly accumulating on the floor under the conveyor, several disadvantages remain.

The underguard assembly described above is difficult to install and adjust. The apertures must be placed at precise locations along the edges of the web to match up with the hooks hanging on the sides of the conveyor frame. Stress in the web material is inevitable due to the localized nature of the engagement of the hooks in the apertures. Further, in a conveyor system using several modular conveyors placed end-to-end, it is often necessary to shorten or lengthen the conveyor during a custom installation. Such minor changes in the length of the conveyor cause the hooks to become misaligned from the apertures in the web. This is particularly true for a conveyor system incorporating sections of the curved, side flexing modular conveyors, which inevitably causes the web material to gather along the curve, thereby creating additional misalignment between the hooks and apertures.

Also, the use of hooks supports the web only at specific locations along its length. The accumulation of debris between the supported and unsupported portions of the web causes undesirable sagging. Further, this accumulation of debris significantly increases the amount of the localized stress on the apertures in the web material, creating undesirable stretching. This combination of sagging and stretching results in an aesthetically unappealing underguard and conveyor system, and may also eventually cause the hooks to tear through the apertures in the web material, thereby resulting in underguard failure.

Additionally, it is advantageous to provide an underguard that extends beyond the ends of each modular conveyor to overlap with the underguard of a second, in-line modular conveyor, thereby providing seamless underguard function. As hooks must be supported by the frame of the conveyor, it is simply not possible to provide sufficient support for the web beyond the ends of the conveyor frame to achieve this desirable overlap.

Accordingly, a need exists for an underguard assembly to catch debris that falls from or through a modular conveyor having an improved means of support. The underguard assembly would be easy to install and remove and would provide support along the entire length of the conveyor. Further, the material forming the underguard would be free of localized stress along the edges where the support is provided and deleterious stretching is minimized. The edges should be reinforced and securely sealed to keep out debris. In addition, the underguard would extend beyond the ends of the modular conveyor, thereby allowing overlap and seamless protection between the underguard assemblies of two in-line modular conveyors.

SUMMARY OF THE INVENTION

Thus, with the aforementioned needs in focus, it is a primary object of the present invention to provide an improved underguard assembly that hangs beneath a modular conveyor to catch debris or the like, and an improved conveyor system utilizing one or more such underguard assemblies.

Another object of the invention is to provide an underguard assembly with a flexible web material that is substantially free of localized stress and minimizes stretching, and the reinforced edges are securely sealed.

Still another object of the invention is to provide an underguard assembly including support means that allow for the easy and secure attachment of the underguard along the entire length of a modular conveyor.

Yet another object of the invention is to provide an underguard assembly that is supported beyond each end of the modular conveyor to provide substantially seamless underguard function between two modular conveyors placed in-line or end-to-end.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an underguard assembly is provided for placement beneath a modular conveyor for catching debris that falls from or through the conveying surface. In the preferred embodiment, the underguard assembly includes a substantially rectangular web of material having longitudinal edges and corresponding ends. The web is preferably made of a relatively thin sheet of a flexible, yet durable, plastics material, such as polyvinyl chloride, although the use of other materials known in the art as having similar properties is possible.

In accordance with an important aspect of the present invention, the longitudinal edges of the web form a elongate sealed pocket that contains a stiffener rod of relatively stiff, extruded plastic, such as polyethylene. More specifically, each edge of the web is folded over onto the body of the web itself to form a hem. The inside edge of this hem is then sealed to the body of the web to form a pocket having open ends. The stiffener rod is slidably inserted through a selected open end of each pocket for reinforcement of the edges of the web. The ends are sealed, thereby forming the pocket that fully contains the stiffener rod. The longitudinal ends of the web between the edges are folded over and also sealed.

Preferably, the seals to form the pockets are made integrally and permanently in the web using ultrasonic sealing means. This manner of sealing advantageously provides a substantially seamless seal, thereby avoiding spaces or voids wherein debris, such as loose food product, may accumulate.

Each stiffener rod forms an enlarged bulbous protrusion along the longitudinal edges of the web. This protrusion not only provides the advantageous function of edge reinforcement, but also assists in the easy and efficient installation and removal of the web to or from the conveyor system, as will be described in more detail below.

To support the web such that it hangs in the desired manner below the conveyor, means for detachably securing the web to the sides of the conveyor frame are provided. In the preferred embodiment, these detachable securing means comprise a plurality of support assemblies attached to both sides of the conveyor frame in an opposed fashion. More particularly, and in accordance with yet another important aspect of the present invention, the support assemblies include a support body attached to the conveyor frame, a clamp body that is detachably secured to the support body, and an adjustment means for locking the clamp body against the support body.

In operation, after the support assemblies are attached to each side of the conveyor frame in a spaced relationship, the enlarged pocket or hem of the web with the stiffener rod inside is slidably inserted upwardly between the support and clamp bodies of each of said support assemblies on both sides. The adjustment means is utilized during the process to urge each clamping body towards the corresponding support body, thereby capturing and locking the enlarged pockets, and thus the web to the conveyor frame.

Once this operation is completed at each spaced support assembly along the sides of the conveyor, the result is that the web is firmly and evenly supported, and thus hangs in an efficient manner centered below the conveyor. The support assemblies as described above, advantageously allow for the easy and efficient installation of the underguard to the conveyor. Moreover, the stiffener rod extends the length of the each edge of web and, in conjunction with the plurality of spaced support assemblies, provides non-interrupted support for each side of the web. This establishes the substantially even and continuous support along the entire length of the conveyor, thereby avoiding the troublesome sagging that characterizes similar prior art arrangements.

In accordance with yet another important aspect of the present invention, the underguard assembly may be formed such that it extends beyond the ends of the modular conveyor. Of course, to provide such a function, the web material must overlap between the adjacent conveyors. Extended support assemblies are attached at each end, and along both sides of the conveyor frames. This extension of the web allows for two modular conveyors of a conveyor system to be placed in-line or end-to-end, with the underguard of the first modular conveyor securely coupling to the underguard of a second modular conveyor. Advantageously, this provides the conveyor system with an underguard function that is continuous along the full length of the conveyor line.

As these conveyor systems incorporate side flexing modular conveyors, another aspect of the underguard of the present invention is to form the web material to allow it to fit a curve. One way to facilitate this function is to provide a plurality of slits adjacent the seal formed along the longitudinal edges of the web. As the hem with the stiffener rod inside is tensioned for attachment along the outside curve, these slits advantageously prevent the web material from excessive gathering. The same is true when the hem/stiffener rod is in compression for attachment along the inside curve.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawings incorporated in and forming a part of the specification, illustrates several aspects of the present invention and together with the description serves to explain the principles of the invention. In the drawings:

FIG. 2 is a plan view of the web of the underguard assembly, including the stiffener rods contained in sealed pockets formed in each longitudinal edge of the web;

FIG. 3a is an enlarged view of one corner of the web, with a cut-away of the sealed pocket forming the hem and exposing the stiffener rod disposed therein, and further showing the seals along the edges of the pocket;

FIG. 3b is an enlarged cut-away view showing the slits adjacent the sealed pocket that allow the stiffener rod to be tensioned for attachment to an outside curve of a curved modular conveyor, without causing the web material to gather along the hem and stiffener rod;

FIG. 3c is a similar enlarged cut-away view showing the stiffener rod in compression for attachment to the inside curve of a curved modular conveyor;

Reference will now be made in detail to the present preferred embodiment of the invention, an example of which is illustrated in the accompanying drawings.

DETAILED DESCRIPTION OF THE INVENTION

Figure 1:
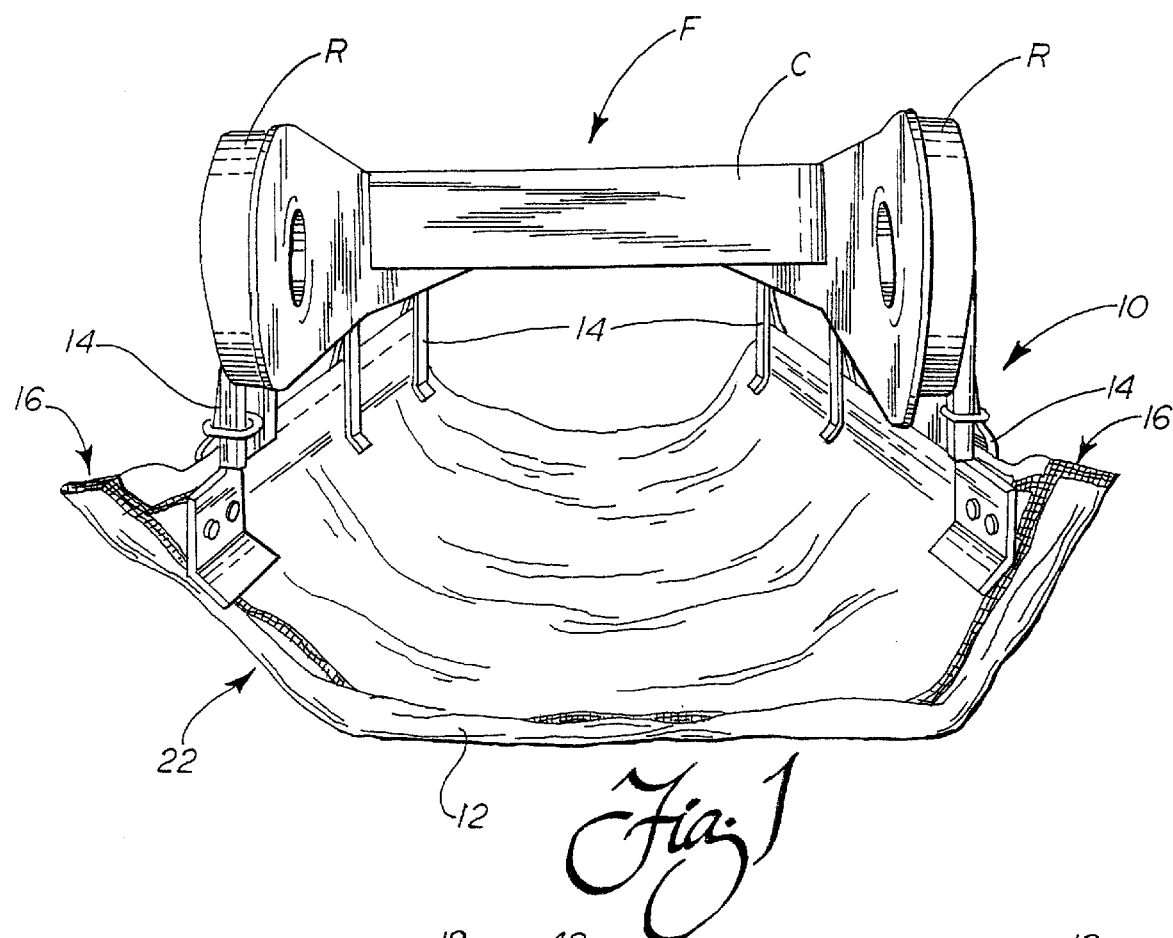
FIG. 1 is a vanishing frontal view looking down the run of a modular conveyor, showing both the frame of the conveyor and the underguard assembly of the present invention, including the web supported by and hanging below the conveyor frame and the support assemblies.

Reference is now made to FIG. 1 showing the underguard assembly 10 of the present invention hanging under and supported by the frame F of a modular conveyor. For purposes of illustration, the conveyor frame F is shown as having a pair of opposed guide rails R connected by one or more cross members C. However, the underguard assembly 10 is equally adaptable for use on a modular conveyor frame F having a unitary guide rail or the like (not shown).

As illustrated, the underguard assembly 10 includes a substantially rectangular flexible web 12. The web 12 is supported by detachable securing means, generally designated by the numeral 14, located on the outside of each opposed guide rail R. As should be appreciated, the web 12 is positioned so as to catch any debris that falls from or through the conveying surface (not shown).

As best shown in FIGS. 2 and 3a, each longitudinal edge 16 of the web 12 has a pocket or hem 18 formed along it, which contains a stiffener rod 20 for reinforcement and adding rigidity to the edge. Specifically, to provide this arrangement, each longitudinal edge 16 of the web 12 is folded over along substantially the entire length of the web. The inside of the hem is preferably mechanically sealed to the body of the web 12 along its longitudinal edge. After the insertion of a stiffener rod 20 in each pocket 18, the ends are sealed.

The stiffener rod 20 corresponds to the length of the pocket 18. It is preferably fabricated of relatively stiff extruded plastic, such as high density polyethylene, or it can be a stiff dowel of urethane rubber or equivalent. The longitudinal ends 22 of the web 12 are folded over adjacent the ends of the rod 20 and sealed. As can now be appreciated, this provides a completely sealed pocket 18 that fully contains the stiffener rod 20. Furthermore, as can now be realized, the pocket and rod combination forms an enlarged bulbous protrusion 23 along each edge 16. This form allows the pocket to serve to secure the web 12 in a continuous manner, rather than in an interrupted manner that is prevalent where spaced hooks are used as in the past.

As best shown in FIG. 3a, a seal 24 is provided along the entire length of both pockets 18, including the ends of the pockets, and along each edge of the folded-over ends 22 of the web. In the preferred embodiment, wherein the web material is made of a thin sheet of a plastics material, these seals 24 are permanently formed through ultrasonic welding techniques, which uses the high frequency, vibratory energy converted to heat through friction to melt and fuse material together. As designated by the cross-hatching along the edges and ends of the pocket 18, the use of the preferred method of ultrasonic welding provides an integrally formed, seamless seal that is relatively simple and inexpensive. The ultrasonic sealing technique requires one piece of equipment and takes very little time to complete. This seal advantageously prevents loose bits of food, or other debris, from entering and contaminating the pocket 18. Although FIG. 3a shows only one corner, it should further be appreciated that identical seals are ideally formed along each edge of both pockets 18 and at each end 22 of the web 12 (see FIG. 2).

As it is often necessary to provide sections of curved modular conveyors to accommodate the side flexing feature of a custom installation, it is also contemplated that the seals 24 are provided with a plurality of small, depending slits or gaps 25 (see FIGS. 3b and 3c). When the web material 12 is sized to fit on a curved modular conveyor section, these slits 25 that extend over only a portion of the width of the seal, advantageously allow the hem or pocket 18 and the inside rod 20 to be tensioned to fit along the outside edge of the curve (FIG. 3b), or compressed to fit the inside of a curve (FIG. 3c), without creating substantial gathering in the web material. Specifically, the slits 25 allow the material adjacent the seal to expand during the tensioning of the rod or to contract during compression.

Figures 4A, 4B:
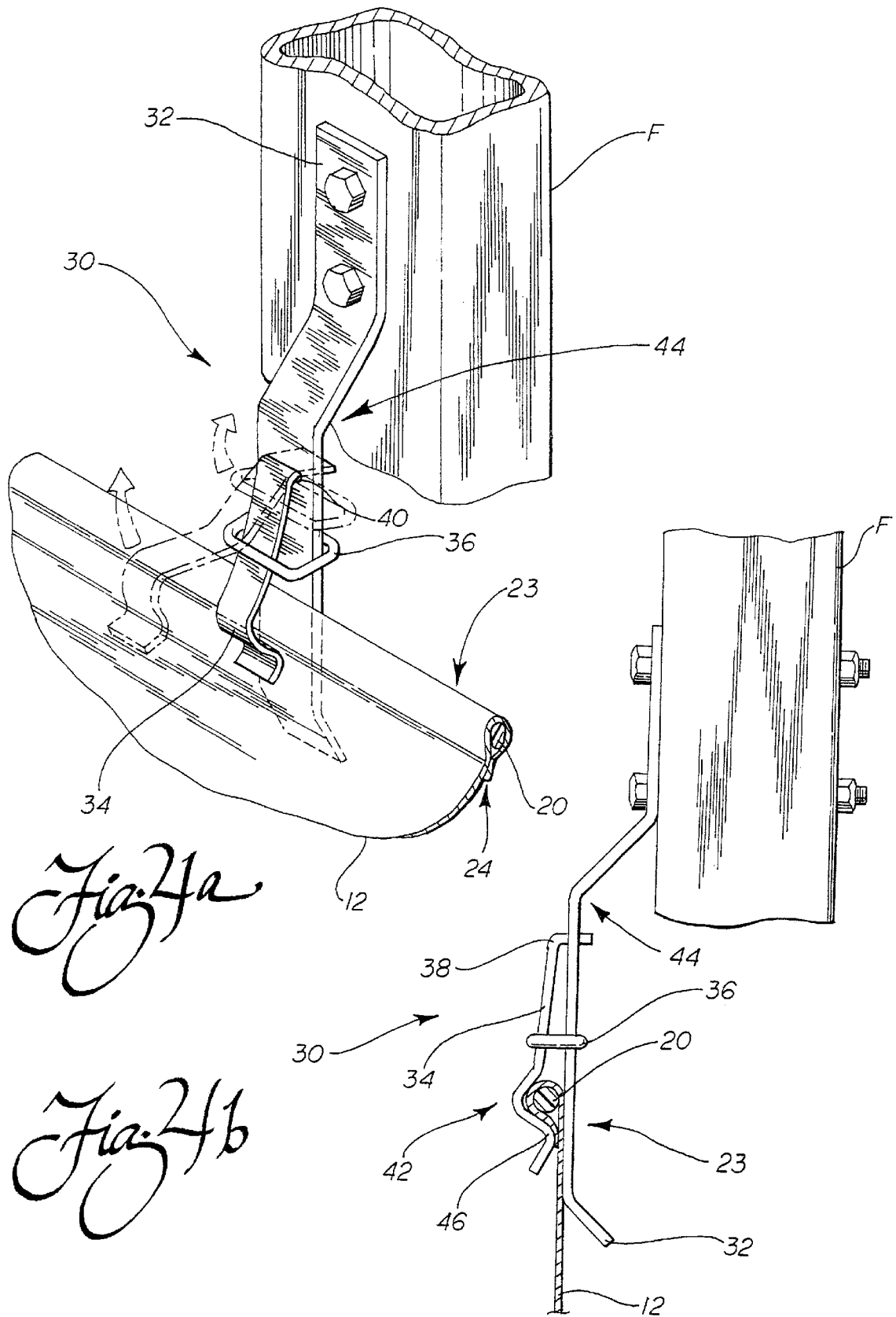
FIG. 4a is an enlarged perspective view showing the details of one of the support assemblies that secures the web along the frame of the modular conveyor, including a support body attached to the conveyor frame, a clamping body pivotally secured in a slot in the support body, and a slip ring that is selectively raised or lowered to capture the enlarged hem of the web.
FIG. 4b is a similar enlarged view showing a support assembly, including the slip ring lowered in locking engagement over the clamping body to capture the enlarged hem of the web.

As noted above, the web 12 is supported on the sides of the conveyor frame F by detachable securing means 14. In the preferred embodiment, and as best shown in FIGS. 4a and 4b, the detachable securing means 14 are support assemblies 30 that allow for the web 12 to be easily and efficiently installed onto and removed from the sides. More particularly, the support assemblies 30 include a support body 32 for attachment to the conveyor frame F, a clamp body 34 for detachable securement to the support body, and adjustment means 36 for locking the two bodies together.

An upper curved portion 38 of the clamp body 34 is pivotally mounted in a slot 40 formed in the support body 32. The adjustment means 36, which is shown as a locking slip ring, holds the bodies together when lowered into the full line position of FIGS. 4a, 4b. As illustrated, the free end of the clamp body 34 is provided with an S-shaped bend 42, that clamps and secures the bulbous shaped pocket 18 with the reinforcing rod 20 on the inside.

The support assemblies are installed in a spaced relationship at strategic locations along the sides of the guide rails R, so as to provide non-sagging support for the web 12. The rod 20 reinforces and stiffens the web to assure not only efficient operation to catch all debris, but to enhance the aesthetics of the entire conveyor system.

Referring again to FIG. 1, it should be appreciated that spaced support assemblies 30 are provided along the outside of each guide rail R. A bend 44 in the support body 32 provides this advantageous function of spacing the web 12 outwardly away from the conveyor frame F, thereby allowing debris that falls from the sides of the conveying surface (not shown) to be captured.

During installation of the web 16, each slip ring 36 and clamp body 34 are raised in turn (see FIG. 4a dotted line position) to allow each section of the web to be progressively placed in its operating position. The S-shaped bend 42 provides a shelf-like inward projection 46 on which the enlarged pocket 18 rests for clamping. As the two bodies are gripped and brought together, the slip ring 36 drops downwardly into the locked full line position. The ring is then snugged into its lowered position, thereby capturing the enlarged pocket 18 and securing the web 12 in place along the sides of the conveyor frame F. Gravity acting on the slip ring, as well as the spring nature of the clamp body and thus the induced friction along the line of contact with the ring, prevents the support assemblies 30 from being inadvertently released.

Thus, as should now be appreciated, the support assemblies 30 allow the web 12 to be easily and efficiently installed to provide the necessary underguard function to a modular conveyor. Similarly the web 12 can be just as easily removed for cleaning by simply manually squeezing the clamp body inwardly and raising each clamping ring 36 in turn, to allow the web and the captured debris to drop to the floor, whereupon it can be pulled from under the conveyor at one end. After cleaning, the web is easily reattached cutting the downtime and lost production of the conveyor system to a minimum.

Figure 5:
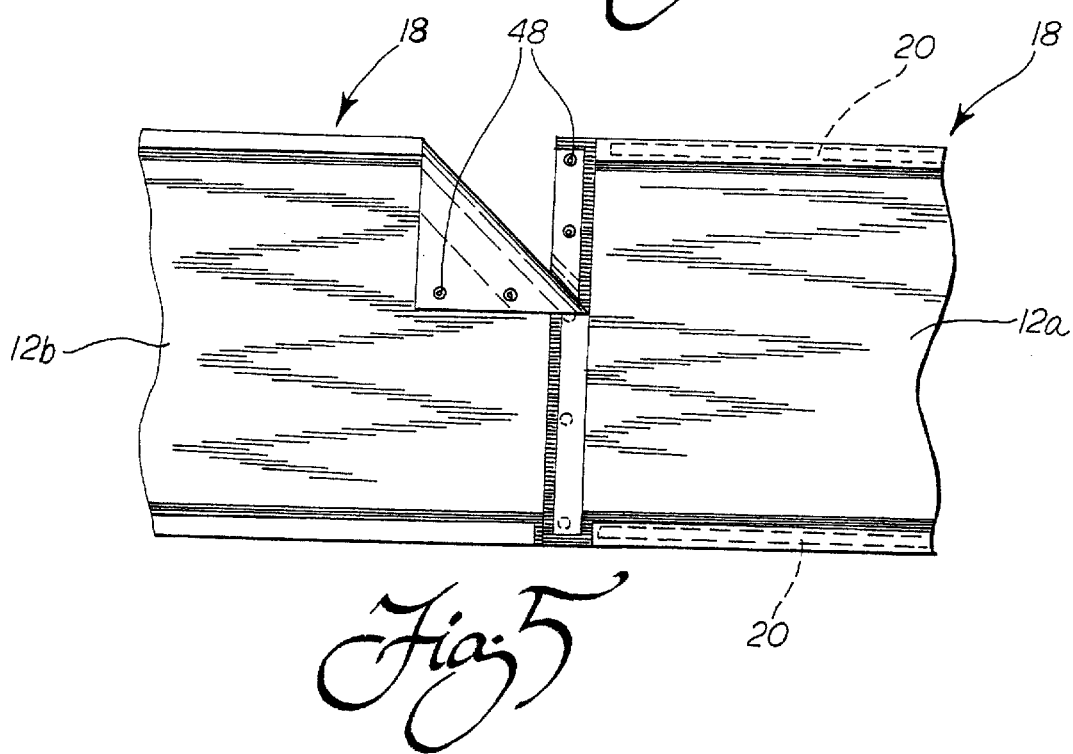
FIG. 5 is a plan view of two adjacent webs overlapping to provide substantially continuous underguard function with snap assemblies for coupling, either between two webs of a singular modular conveyor or between the webs of two modular conveyors placed in an in-line or end-to-end relationship.

As illustrated in FIG. 5, the securing means to couple adjacent webs together preferably comprise opposed snap assemblies 48 attached to the top of a first web 12a and the bottom of a second web 12b, respectively. These snap assemblies 48 allow multiple webs 12a, 12b to not only be quickly and efficiently attached together, but to do so in a very secure manner. Extended and reliable underguard protection for modular conveyor systems is the desired result.

Figures 6A, 6B:
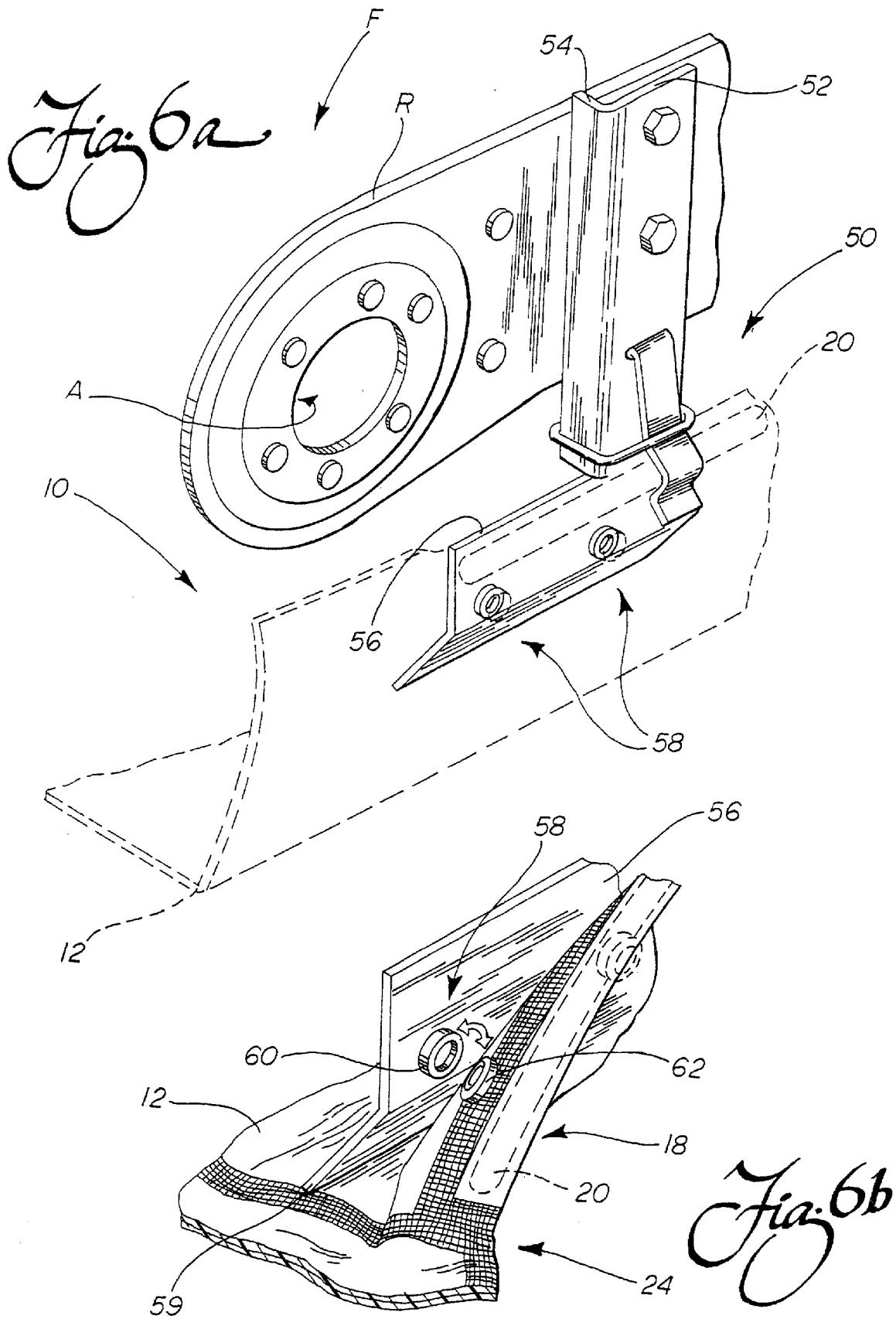
FIG. 6a is an perspective view of the extended support assembly for each end of the conveyor frame for supporting the web, including snap assemblies for attaching the web.
FIG. 6b is a related enlarged perspective view of the attachment of the corner of the web to the extended support assembly using the snap assemblies.

To secure and support the portion of the web 12 which extends beyond the conveyor frame as shown in FIGS. 6a, 6b, a special end support assembly 50 is provided. Although similar in design to the support assemblies 30 used along the sides of the guide rail R, the support assembly 50 is modified in two respects. First, instead of a bend, the support body 52 is provided with a flange 54 at the upper end. This flange 54 spaces the assembly 50 away from the guide rail R so as to avoid any interference with the drive or idler shaft (not shown) normally positioned in aperture A.

Further, in addition to the clamp body 34 and slip ring 36, which are the same as those in the regular support assembly 30, the assembly 50 is provided with an extension 56. The lower half of the extension 56 is provided with an angular bend 59 (see FIG. 6b) to assist in providing the desired curved shape to the web 12. In the preferred embodiment, this extension 56 is provided with securing means 58 along its length, which are preferably opposed snap assemblies 58 that secure and support the portion of the web 12 external to the conveyor frame.

As is specifically illustrated in FIG. 6b, the stud 60 of the snap assembly 58 is secured on the extension 56, and the opposed, mating socket 62 is secured at the corner of the web 12. Once assembled, these snap assemblies assist the longitudinal clamping function of the support assemblies 50. That is, this helps prevent the web material 12 from sliding in a longitudinal direction. Although only one corner is shown, it should be appreciated that the web 12 is supported and secured in this manner on both sides and on both ends of the conveyor.

As should now be appreciated, the underguards of two modular conveyors placed in an end-to-end relationship overlap, thereby providing substantially seamless underguard function in a conveyor system. Moreover, providing the overlapping webs of two separate modular conveyors with securing means, such as those shown in FIG. 5, prevents the overlapping portions from accidentally disconnecting.

In summary, an underguard assembly 10 is provided for use with a modular conveyor in a conveyor system. A flexible web 12 that hangs beneath the conveyor serves to catch debris falling from the sides of or through the conveying surface of the conveyor (See FIG. 1). To support the web 12, a stiffener rod 20 is contained in an elongate pocket or hem 18 formed along each longitudinal edge 16 (see FIG. 2). Opposed support assemblies 30 spaced along the sides of the conveyor frame F act to capture and secure the enlarged pocket (see FIGS. 4a and 4b). A locking slip ring 36 is provided on each support assembly 30, thus allowing the web 12 to be easily attached and detached from the conveyor frame F. Further, the support assemblies adjacent the ends of the conveyor frame 50 are modified to support the web 12 beyond the end of the conveyor (see FIGS. 6 and 6a). This allows the web of a first modular conveyor to overlap with the web at the start of an adjacent modular conveyor (see, e.g. FIG. 5), thereby providing a substantially seamless underguard function in a conveyor system.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. An underguard assembly for a modular conveyor including a conveying surface, and a frame comprising:
    a web having first and second longitudinal edges, each of said longitudinal edges having a sealed pocket formed therein;
    a stiffener rod contained in each of said sealed pockets forming an enlarged pocket; and
    a plurality of spaced underguard support assemblies disposed along each side of the frame, for engagement with the pocket,
    whereby said web is supported by and hangs beneath the modular conveyor to catch debris falling from the sides of or through the conveying surface.

2. The underguard assembly according to claim 1, wherein said web is longer than the modular conveyor, whereby said web overlaps with a web of a second modular conveyor placed in an end-to-end relationship.

3. The underguard assembly according to claim 2, wherein a seal is formed for each of said sealed pockets by folding and sealing said longitudinal edge onto said web and inserting said stiffener rod.

4. The underguard assembly according to claim 3, wherein the ends of said web are folded and a seal is formed adjacent the ends of said stiffener rods, whereby said stiffener rod is completely contained within said sealed pocket.

5. The underguard assembly according to claim 4, wherein said seals are ultrasonically formed, whereby said sealed pocket is impervious to debris.

6. The underguard assembly according to claim 1, wherein said sealed pocket is provided with a plurality of slits adjacent said stiffener rod, whereby said slits allow said pocket and rod to be tensioned or compressed for attachment to a curved section of modular conveyor without causing said web to gather along said stiffener rod.

7. The underguard assembly according to claim 2, wherein each of the ends of said web are provided with means for securing said web to a web of a second modular conveyor.

8. The underguard assembly according to claim 7, wherein said securing means are snap assemblies.

9. An underguard assembly for use with a modular conveyor having a conveying surface supported by a frame, comprising:

a web having first and second longitudinal edges, each of said longitudinal edges having a sealed pocket formed therein;

a stiffener rod contained in each of said sealed pockets forming an enlarged bulbous protrusion;

means for detachably securing each of said enlarged pockets to the frame of the modular conveyor;

whereby said web is supported by and hangs beneath the modular conveyor to catch debris falling from the sides of or through the conveying surface.

10. The underguard assembly according to claim 9, wherein the modular conveyor frame includes first and second opposed guide rails and said detachable securing means includes a plurality of underguard support assemblies attached to the outside of each guide rail.

11. The underguard assembly according to claim 9, wherein each of said sealed pockets is formed by folding and sealing said longitudinal edge to form a hem.

12. The underguard assembly according to claim 10, wherein each of said underguard support assemblies comprises:

a support body having a slot;

a clamp body having a curved proximal end for insertion in said slot; and adjustment means for locking said clamp body against said support body with the enlarged pocket inbetween, whereby said web is easily attached and detached from the frame.

13. The underguard assembly according to claim 10, wherein said adjustment means includes a slip ring slidably engaged over said support and clamp bodies for selectively locking said clamp body against said support body.

14. In a conveyor system for feeding articles such as food product or the like, the improvement comprising:

at least one modular conveyor having a conveying surface supported by a frame;

at least one web having first and second longitudinal edges, each of said longitudinal edges having a sealed pocket formed therein;

a stiffener rod contained in each of said sealed pockets forming an enlarged pocket;

means for detachably securing said enlarged pocket to said frame of said modular conveyor;

whereby each web is supported by and hangs beneath said modular conveyor to catch debris falling from the sides of or through the conveying surface.

15. The modular conveyor of the conveyor system of claim 14, wherein said frame includes first and second opposed guide rails and said detachable securing means includes a plurality of underguard support assemblies attached to the outside of each of said guide rails.

16. The modular conveyor of the conveyor system of claim 14, wherein each of said pockets is formed by folding and sealing said longitudinal edge adjacent said stiffener rod, whereby said enlarged pocket is formed.

17. The modular conveyor of the conveyor system of claim 16, wherein each of said underguard support assemblies comprises:

a support body having a slot;

a clamp body having a curved proximal end for insertion in said slot; and adjustment means for selectively forcing said clamp body against said support body, whereby said web is easily attached and detached from the guide rail by capturing a portion of said enlarged pocket between said clamp and support bodies and adjusting said adjustment means.

18. The underguard assembly according to claim 17, wherein said adjustment means includes a slip ring slidably engaged over said support and clamp bodies for selectively forcing said clamp body against said support body.

19. The modular conveyor of the conveyor system of claim 14, wherein each end of said web extends beyond the adjacent end of said modular conveyor.

20. The modular conveyor of the conveyor system of claim 19, wherein said detachable securing means includes an extended support assembly for attachment at the end of each of said guide rails.

21. The modular conveyor of the conveyor system of claim 20, wherein said extended support assembly includes securing means, whereby the end of said web extending beyond the end of the modular conveyor is secured to and supported by said extended support assembly.

22. The modular conveyor of the conveyor system of claim 21, wherein said securing means includes at least one snap affixed to each corner of said web for mating with a mating opposed snap on said extended support assemblies.

23. The modular conveyor of the conveyor system of claim 22, wherein the ends of said web overlap with a web of an adjacent modular conveyor, whereby substantially seamless underguard function is provided between two modular conveyors placed in an end-to-end relationship.

* * * * *